(12) United States Patent
Kulkarni

(10) Patent No.: US 11,744,391 B2
(45) Date of Patent: Sep. 5, 2023

(54) HOOK FOR HANGING BASKET

(71) Applicant: Concept Plastics Limited, Ontario (CA)

(72) Inventor: Arun Kulkarni, Ontario (CA)

(73) Assignee: Concept Plastics Limited, Brantford (CA)

( * ) Notice: Subject to any disclaimer, the term of this patent is extended or adjusted under 35 U.S.C. 154(b) by 76 days.

(21) Appl. No.: 17/236,088

(22) Filed: Apr. 21, 2021

(65) Prior Publication Data

US 2021/0321797 A1   Oct. 21, 2021

(51) Int. Cl.
*A47G 7/04* (2006.01)
*B65D 25/22* (2006.01)

(52) U.S. Cl.
CPC ............. *A47G 7/044* (2013.01); *B65D 25/22* (2013.01)

(58) Field of Classification Search
CPC ........ A47G 7/044; A47G 7/047; B65D 25/22; F16B 45/008; F16B 45/012
USPC ....... 248/27.3, 229.16, 229.26, 228.8, 230.7, 248/231.81, 316.7, 317, 318
See application file for complete search history.

(56) References Cited

U.S. PATENT DOCUMENTS

| | | | | |
|---|---|---|---|---|
| 3,809,358 A | * | 5/1974 | Hazeley | .................... E04B 9/28 248/317 |
| 4,440,371 A | * | 4/1984 | Wijsman | ................ A47G 7/047 248/318 |
| 5,576,933 A | * | 11/1996 | Campanella | ........ H01L 23/4093 174/16.3 |
| 5,662,679 A | * | 9/1997 | Voss | ........................ A61H 39/04 606/151 |
| 6,141,837 A | * | 11/2000 | Wisniewski | .......... F16B 5/0614 24/295 |
| 7,051,408 B2 | * | 5/2006 | De Azevedo | ......... F16B 5/0614 24/295 |
| 7,610,717 B2 | * | 11/2009 | Luken | .................... A47G 7/047 47/65.5 |
| 9,080,588 B2 | * | 7/2015 | Diez Herrera | ........ F16B 21/075 |
| 2004/0251286 A1 | * | 12/2004 | Badillo | ................... A45F 5/021 224/269 |
| 2013/0133254 A1 | * | 5/2013 | O'Brien | ................ A01G 9/024 248/318 |

* cited by examiner

*Primary Examiner* — Muhammad Ijaz
(74) *Attorney, Agent, or Firm* — Renner, Otto, Boisselle & Sklar, LLP

(57) ABSTRACT

A hook for hanging a basket. A hook includes a wing member which helps in pressing two arms for easy removal of the basket. The hook includes a one way hook for holding a metal loop firmly therein. The hook is inserted into the metal loop and upon insertion of the hook, the metal loop stays firmly in a place thereof held by the one way hook that restricts the metal loop coming out of the hook. The hook provides the combined benefits of both metal hanger and convenience of plastic hanger. The hook is easy and fast to attach and remove if necessary.

5 Claims, 3 Drawing Sheets

HOOK FOR HANGING BASKET

CROSS-REFERENCE TO RELATED PATENT APPLICATION

This United States Non-Provisional Patent application claims priority to and relies for priority on Indian Patent Application Number 202021017043, filed on Apr. 21, 2020, the entire contents of which is incorporated herein by reference.

FIELD OF THE INVENTION

The present invention relates to a hook for hanging basket and more particularly, to the hook for hanging basket which supports heavy baskets and/or pot of plant.

BACKGROUND OF THE INVENTION

Hanging baskets for pot of plants normally use either full plastic or metal hanger. However, such plastic hangers cannot support heavy basket/pot of plant and metal hangers are cumbersome and labour intensive to attach. Further, it is very difficult to remove basket/pot of plant from the hanger.

While using metal hangers, ends of metal wire have to be twisted through holes in the pot/basket to hold the basket. But, this is very laborious task and not user friendly. Further, it is very difficult to remove the pot/basket from the hanger in case of need.

U.S. Pat. No. 4,440,371 discloses a hanger for a pot having a protruding rim part, for example, a flower pot. The hanger comprises a suspension member and at least three carrying members connected by means of wire elements with said suspension member, each carrying member having a leg bounding a slot in downward direction for resiliently engaging the rim part of the pot.

However, these types of hangers are not sturdy and the legs along with slots are specific to particular pot. Hence, such types of hangers are not universal. Generally, any one of the metal hanger or the plastic hanger is used conventionally. But, the hangers made of only metal increases the cost of the raw material whereas the hangers made of plastic are not sturdy. Both the hangers are difficult and time consuming to remove from the pot.

Accordingly, there exists a need to provide a hook for hanging a basket which overcomes the above-mentioned drawbacks of the prior art.

OBJECTS OF THE INVENTION

An object of the present invention is to provide benefits of both metal hanger and convenience of plastic hanger and easy, and fast to attach and remove if necessary.

Another object of the present invention is to provide a hook that supports heavy basket or pot of plants.

SUMMARY OF THE INVENTION

Accordingly, the present invention provides a hook for hanging a basket. The hook comprises a U shaped member. The U shaped member includes a one way hook protruding towards inner side thereof, and two arms extending upwardly from the open end therefrom. Each arm includes a wing member attached on an outer portion thereof. Each arm at an open end thereof is tapered inside to form a hook shaped structure for hanging the basket therein. Specifically, the wing members are attached at a predefined angle to the outer surface of the arms and the wing members when pressed opens up the hook to insert and remove the basket. More particularly, the wing members are attached at an angle of 170 degree to the outer surface of the arms. The hook shaped structure of the arms helps to hang the basket with their rim. In accordance with the present invention, the hook is made of a plastic material and inserted into a metal loop. Upon insertion of the hook, the metal loop stays firmly in a place thereof held by the one way hook that restricts the metal loop coming out of the hook.

BRIEF DESCRIPTION OF THE DRAWINGS

The objects and advantages of the present invention will become apparent when the disclosure is read in conjunction with the following figures, wherein.

DETAIL DESCRIPTION OF THE INVENTION

The foregoing objects of the present invention are accomplished and the problems and shortcomings associated with the prior art, techniques and approaches are overcome by the present invention as described below in the preferred embodiment.

The present invention provides a hook for hanging a basket. The hook provides wings which helps in pressing the arms for easy removal of the basket. The hook includes a one way hook for holding a metal loop firmly therein. The hook is easy and fast to attach and remove if necessary.

This present invention is illustrated with reference to the accompanying drawings, throughout which reference numbers indicate corresponding parts in the various figures. These reference numbers are shown in bracket in the following description.

Referring to FIGS. 1a-4, a hook (100) for hanging baskets in accordance with the present invention is shown. The hook (100) provides the combined benefits of both metal hanger and convenience of plastic hanger.

The hook (100) comprises a U shaped member (10). In an embodiment, the hook (100) is made of a plastic material. The U shaped member (10) includes a one way hook (12) and two arms (14, 16). The one way hook (12) protrudes towards inner side of the U shaped member (10).

Figure 1A:
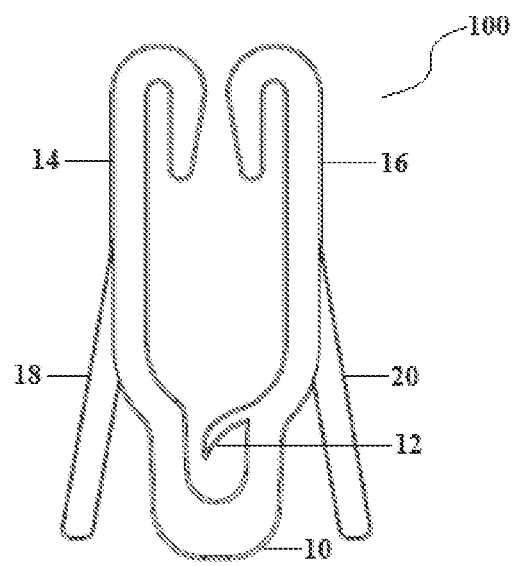
FIG. 1a shows a front view of a hook for hanging a basket, in accordance with the present invention.
Figure 1B:
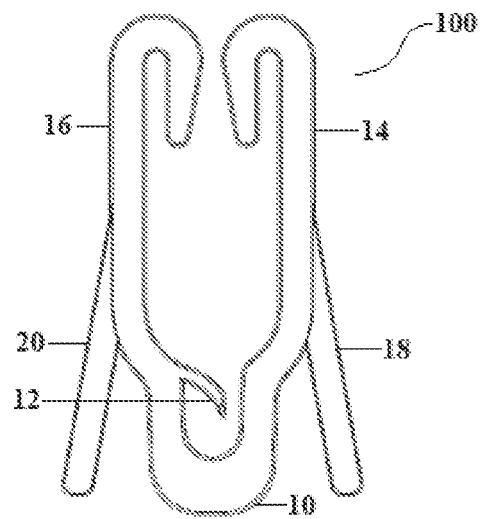
FIG. 1b shows a back view of the hook for hanging the basket, in accordance with the present invention.
Figure 2A:
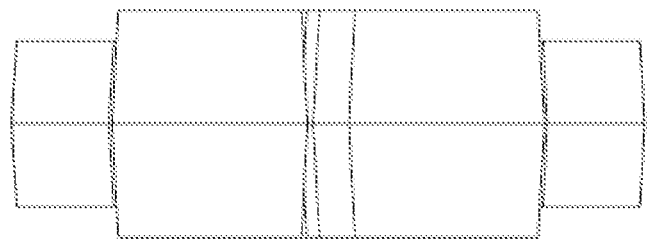
FIG. 2a shows a top view of the hook for hanging the basket, in accordance with the present invention.
Figure 2B:
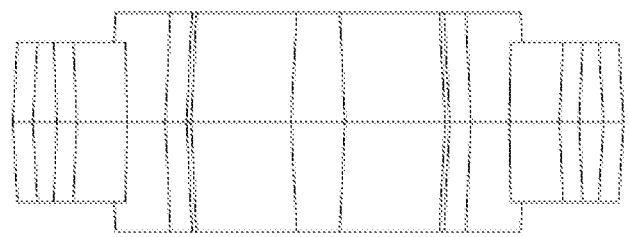
FIG. 2b shows a bottom view of the hook for hanging the basket, in accordance with the present invention.
Figure 3:
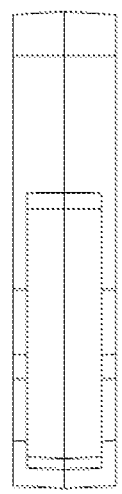
FIG. 3 shows a side view of the hook for hanging the basket, in accordance with the present invention.
Figure 4:
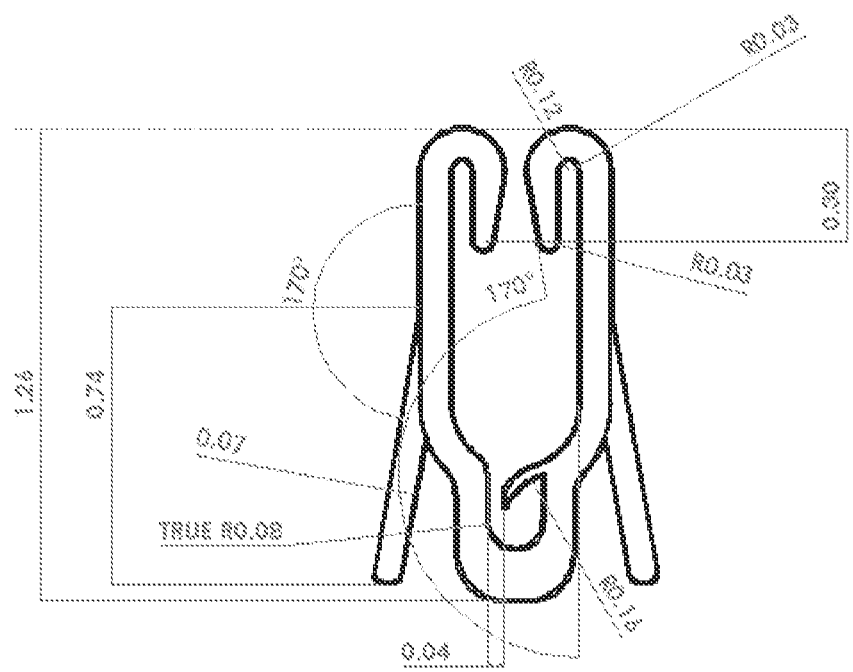
FIG. 4 shows details of an angle between wing members and an outer surface of arms of the hook, in accordance with the present invention.

The two arms (14, 16) extend upwardly from an open end of the U shaped member (10). In a preferred embodiment, each arm (14, 16) extends away from the open end of the U shaped first member (10). Each arm (14, 16) at an open end thereof is tapered inside to form the hook shaped structure for hanging the basket therein. Each arm (14, 16) includes a wing member (18, 20) attached on an outer portion thereof at a predefined angle. In an embodiment, the wing members (18, 20) are attached at an angle of 170 degree to the outer surface of the arms (14, 16). However, it is understood here that the angle of attachment between the wing members (18, 20) to the outer surface of the arms (14, 16) may vary in other alternative embodiments of the present invention and the dimensions shown in FIG. 4 is to be interpreted merely as an illustration and it is in no way to be construed as a limitation. These wing member (18, 20) when pressed, opens up the hook (100) thereby making insertion and removal of the basket easier. In an embodiment, the hook shaped structure of the arms (14, 16) helps to hang the basket with their rim.

During operation, a metal wire at the end of the wire is made into a loop. Generally, the metal wire is flexible and a small loop is made by hand when there is no pot attached thereto. Once the ends of all the 3 or 4 strands are made into the loop, the plastic hook (100) is easily inserted into the loop. Once the hook (100) is inserted, the metal loop stays firmly in a place thereof held by the one way hook (12) that restricts the metal loop coming out of the hook (100).

Advantages of the Invention

1. The hook (100) provides the wing members (18, 20) which helps in pressing the two arms (14, 16) for easy removal of the basket.
2. The one way hook (12) of the hook (100) holds the metal loop firmly therein.
3. The hook (100) is easy and fast to attach and remove if necessary.

The foregoing objects of the invention are accomplished and the problems and shortcomings associated with prior art techniques and approaches are overcome by the present invention described in the present embodiment. Detailed descriptions of the preferred embodiment are provided herein; however, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or matter. The embodiments of the invention as described above and the methods disclosed herein will suggest further modification and alterations to those skilled in the art. Such further modifications and alterations may be made without departing from the scope of the invention.

I claim:

1. A hook for a hanging basket, the hook comprising:
   a U shaped member, the U shaped member having an open end and a one way hook at the open end of the U shaped member and protruding towards an inner side of the U shaped member; and
   two arms extending upwardly from the open end of the U shaped member, each of the two arms having a wing member attached on an outer portion of the respective arms, wherein an open end of each of the two arms distal the U shaped member is tapered inside to form a hook shaped structure for hanging the basket therein.

2. The hook as claimed in claim 1, wherein each wing member is respectively attached at a predefined angle to an outer surface of the respective arm and the wing members when pressed longitudinally separate the two arms from one another and opens up the hook shaped structure.

3. The hook as claimed in claim 2, wherein the wing members are respectively attached at an angle of 170 degree to the outer surface of the two arms.

4. The hook as claimed in claim 1, wherein the hook shaped structure of the two arms is configured to receive a rim of the hanging basket.

5. The hook as claimed in claim 1, wherein the one way hook and U shaped structure are configured to retain a metal loop in the U shaped structure.

\* \* \* \* \*